United States Patent
Kamepalli et al.

(10) Patent No.: US 11,409,853 B2
(45) Date of Patent: Aug. 9, 2022

(54) SYSTEM AND METHOD FOR AUTHENTICATING BEFORE WAKING AN INFORMATION HANDLING SYSTEM

(71) Applicant: Dell Products L.P., Round Rock, TX (US)

(72) Inventors: Srinivas Kamepalli, Austin, TX (US); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/600,655

(22) Filed: Oct. 14, 2019

(65) Prior Publication Data

US 2021/0110016 A1 Apr. 15, 2021

(51) Int. Cl.
*G06F 21/32* (2013.01)
*G06K 7/06* (2006.01)
*G06V 40/16* (2022.01)
*G06V 40/18* (2022.01)
*G06V 40/12* (2022.01)

(52) U.S. Cl.
CPC ............ *G06F 21/32* (2013.01); *G06K 7/06* (2013.01); *G06V 40/1365* (2022.01); *G06V 40/172* (2022.01); *G06V 40/197* (2022.01)

(58) Field of Classification Search
None
See application file for complete search history.

(56) References Cited

U.S. PATENT DOCUMENTS

| | | | |
|---|---|---|---|
| 9,436,818 B1* | 9/2016 | Tooley, II | G06F 21/32 |
| 9,876,859 B1* | 1/2018 | Plummer | H04L 67/143 |
| 2007/0040017 A1* | 2/2007 | Kozlay | H04L 63/0861 |
| | | | 235/380 |
| 2007/0250411 A1* | 10/2007 | Williams | G06Q 10/087 |
| | | | 705/28 |

(Continued)

OTHER PUBLICATIONS

Feng et al., Continuous Mobile Authentication Using Virtual Key Typing Biometrics, 2013 12th IEEE International Conference on Trust, Security and Privacy in Computing and Communications, 2013, pp. 1547-1551 (Year: 2013).*

(Continued)

*Primary Examiner* — Luu T Pham
*Assistant Examiner* — Edward X Long
(74) *Attorney, Agent, or Firm* — Baker Botts L.L.P.

(57) ABSTRACT

A system and method using a system for authenticating a person as an authorized user before waking an information handling system from an inactive state. A sensor receives an input from a person, captures information about the person and a microcontroller unit (MCU) determines if the captured information matches information corresponding to an authorized user. If the MCU determines the captured information corresponds to information corresponding to an authorized user, the MCU sends a command to one of a central processing unit (CPU) or an embedded controller (EC) to change operation of the information handling system to an active state. If the MCU determines the captured information does not correspond to information corresponding to an authorized user, no command is sent to the CPU or EC to change operation of the information handling system.

7 Claims, 3 Drawing Sheets

(56) References Cited

U.S. PATENT DOCUMENTS

2019/0347389 A1* 11/2019 Kawakita .............. G06F 3/0488

OTHER PUBLICATIONS

Meng et al., Touch Gestures Based Authentication Scheme for Touchscreen Mobile Phones, The 8th International Conference on Information Security and Cryptology, 2012, pp. 1-20 (Year: 2012).*

* cited by examiner

SYSTEM AND METHOD FOR AUTHENTICATING BEFORE WAKING AN INFORMATION HANDLING SYSTEM

BACKGROUND

Field of the Disclosure

This disclosure relates generally to information handling systems and, more particularly, to systems and methods for authenticating a person as an authorized user before changing operation of the information handling system from an inactive state to an active state.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

As the capabilities of information handling systems continues to expand, the need for greater security is also increasing. Now in addition to having physical access to a system, users must be authenticated before they can access the system. Accessing the system usually involves a person entering a password or providing some sort of biometric information to the system and the system verifying the information matches information associated with an authorized user. However, powering up a system each time anybody wants to try to access the system is undesirable. For example, when a system is powered up to authenticate a user, the system is more vulnerable to attacks than when the system is powered down, hibernating, or otherwise in an inactive state. Also, the system consumes more power in an active state, so continued attempts by a person to authenticate on a portable information handling system can drain the battery.

Information handling systems described herein are configured to authenticate a person as an authorized user before changing operation of the information handling system from an inactive state to an active state.

As described herein, embodiments are directed to a device for authenticating a person for access to an information handling system before changing operation of the information handling system from an inactive state to an active state. The device comprises a sensor for sensing an attempt to access the information handling system by a person and capturing biometric information from the person, device internal memory storing biometric information associated with an authenticated user, and a microcontroller (MCU) in the device coupled to the sensor and the internal memory. The MCU is configured for receiving, from the sensor, the captured biometric information associated with the person and determining if the captured biometric information matches biometric information stored in the internal memory. If the captured information matches the information corresponding to the authorized user, the MCU is configured to communicate an instruction to a central processing unit (CPU) or an embedded controller (EC) in the information handling system to change operation of the information handling system from an inactive state to an active state. If the captured information does not match the information corresponding to the authorized user, the MCU does not communicate an instruction to the CPU or EC to change operation of the information handling system to the active state. In some embodiments, the device comprises one of a power button, a mouse, a keyboard, a stylus, a touch pad, a camera, a microphone and a card reader and the sensor comprises one of a fingerprint recognition (FPR) sensor, a proximity sensor, an audio sensor and a scanner. In some embodiments, the MCU is configured to filter biometric information based on one or more of time duration and a number of attempts sensed received in a time period. In some embodiments, the biometric information comprises one of user contact with a power button, a mouse, a touchpad, or a stylus, close proximity of a face or hand near a camera, a person's voice, or insertion of a Common Access Card (CAC) in a CAC reader. In some embodiments, the inactive state comprises one of a sleep mode and an off mode.

Embodiments disclosed herein are directed to a method for authenticating a person as an authorized user before changing operation of an information handling system to an active state. The method comprises detecting, by a sensor, an attempt to access the information handling system by a person and capturing biometric information associated with the person and comparing, by a microcontroller unit (MCU) coupled to the sensor, the captured biometric information with biometric information corresponding to an authorized user stored in device internal memory. If the captured information matches biometric information corresponding to an authorized user, the method includes sending a command to a central processing unit (CPU) or an embedded controller (EC) in the information handling system to change the state of the information handling system. If the captured information does not match the information corresponding to the authorized user, no command is sent to the CPU or EC. In some embodiments, the device comprises one of a power button, a mouse, a keyboard, a stylus, a touch pad, a camera, a microphone, a touch screen and a card reader and the sensor comprises one of a fingerprint recognition (FPR) sensor, a proximity sensor, an audio sensor and a scanner. In some embodiments, the MCU is configured to filter biometric information based on one or more of time duration and a number of attempts sensed in a time period. In some embodiments, the inactive state comprises one of a sleep mode and an off mode.

Embodiments disclosed herein are directed to an authentication system for authenticating a person as an authorized user for access to an information handling system before changing operation of the information handling system from an inactive state to an active state. The authentication system comprises a sensor for sensing an attempt to access the information handling system by a person and capturing biometric information associated with the person, authentication system internal memory storing biometric information associated with an authenticated user, and a microcontroller (MCU) coupled to the sensor and the authentication system internal memory. The MCU is configured for receiving, from the sensor, the captured biometric information and determining if the captured biometric information matches biometric information corresponding to an authorized user stored in the authentication system internal memory. If the captured biometric information matches the biometric information corresponding to an authorized user, the MCU is configured to communicate an instruction to a central processing unit (CPU) or an embedded controller (EC) in the information handling system to change operation of the information handling system from an inactive state to an active state. If the captured biometric information does not match the biometric information corresponding to the authorized user, the MCU does not communicate an instruction. In some embodiments, the authentication system comprises one of a power button, a mouse, a keyboard, a stylus, a touch pad, a camera, a microphone and a card reader and the sensor comprises one of a fingerprint recognition (FPR) sensor, a proximity sensor, an audio sensor and a scanner. In some embodiments, the MCU is configured to filter biometric information based on one or more of time duration and a number of attempts sensed in a time period. In some embodiments, the biometric information comprises one of user contact with a power button, a mouse, a touchpad, or a stylus, close proximity of a face or hand near a camera, a person's voice, or insertion of a Common Access Card (CAC) in a CAC reader. In some embodiments, the inactive state comprises one of a sleep mode and an off mode. In some embodiments the authentication system is in a peripheral device coupled to the information handling system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
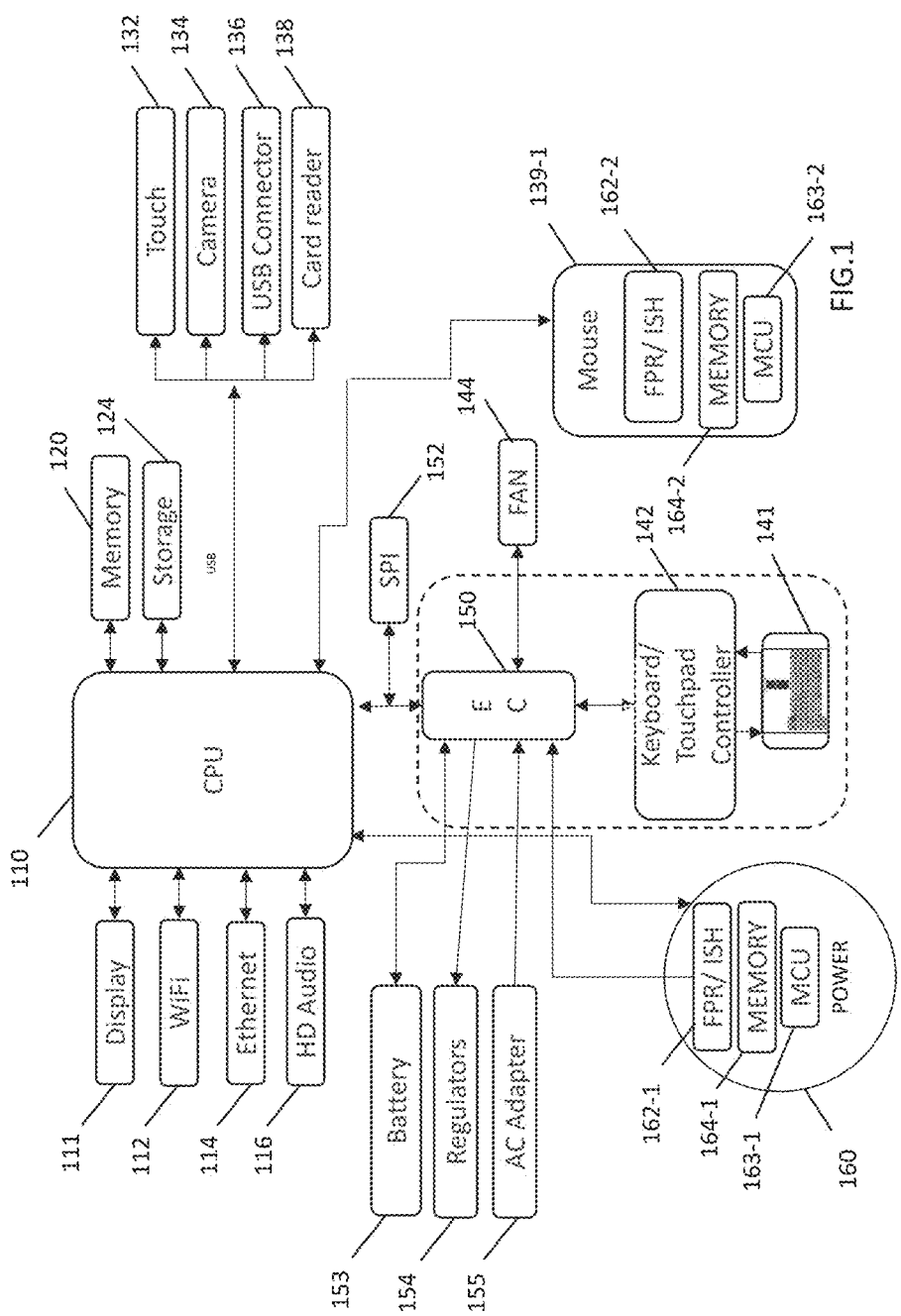
FIG. 1 depicts a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, mouse "139-1", "139-2" and "139-3" all refer to instances of a mouse, which may be referred to collectively as mouse "139" and any one of which may be referred to generically as mouse "139".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) systems, such as a keyboard, a mouse, and a video display. The information handling system may also include one or more buses operable to transmit communication between the various hardware components.

Portable information handling systems allow users greater flexibility in when and where information can be processed. The ability to disconnect the information handling system from a constant power supply, transport the information handling system to a remote location, connect to a wireless network and use an internal battery for power allows users to work from almost anywhere. The wide availability of open Wi-fi networks allows users to easily transport portable information handling systems and communicate with other users, but also represents a vulnerability for malware and other attacks to enter the information handling system.

In some embodiments of portable information handling systems described herein, a microcontroller unit (MCU) is used independent from a CPU or EC to authenticate a person as an authorized user before sending an instruction to the CPU or EC to change operation of the information handling system from an inactive state to an active state. These embodiments allow the information handling system to conserve power and protect the information handling system against hacking, attacks propagated through networks, and other unauthorized access.

Figure 2:
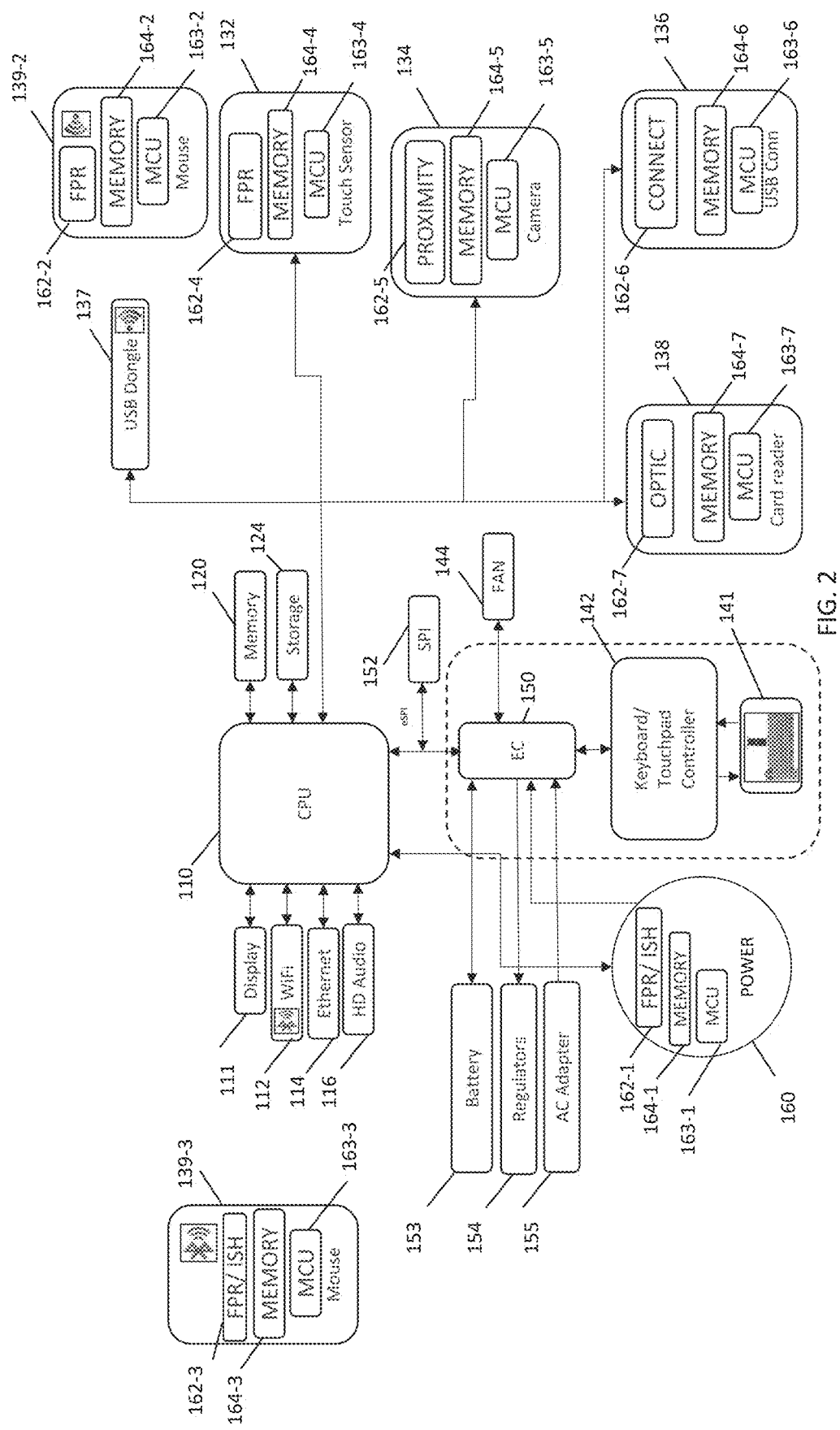
FIG. 2 depicts a block diagram of selected elements of an embodiment of an information handling system.
Figure 3:
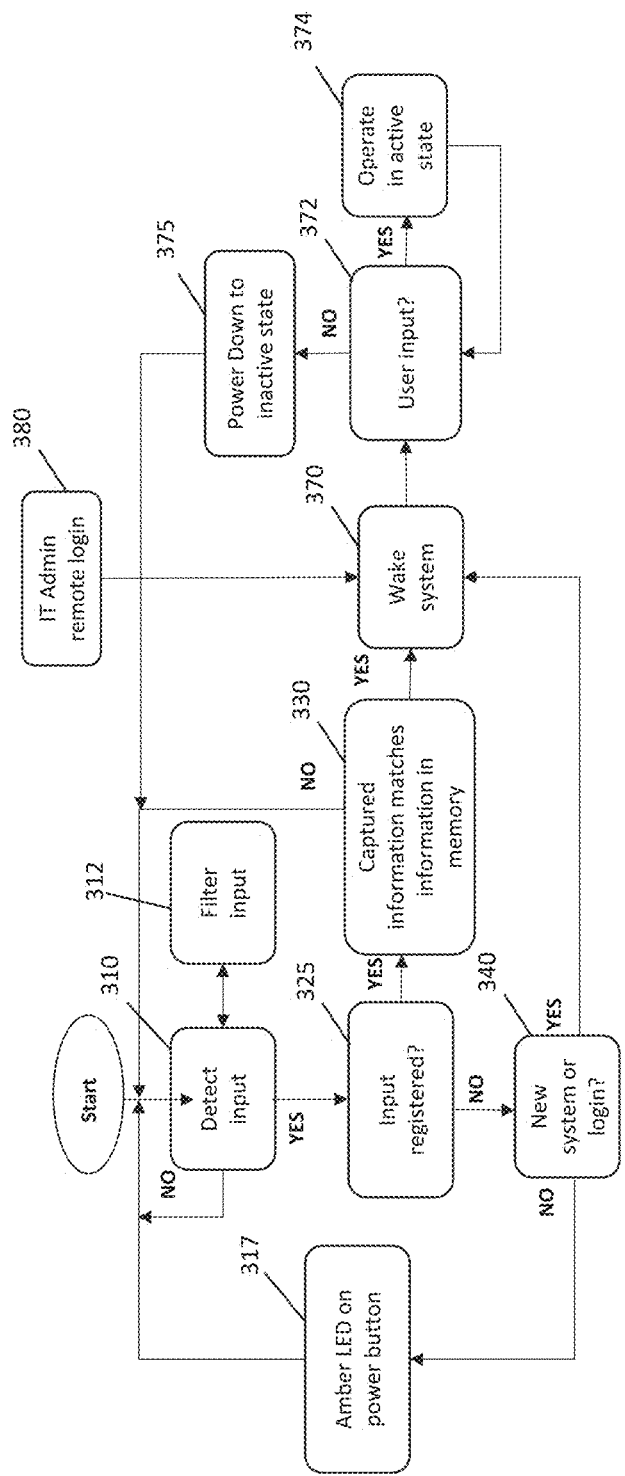
FIG. 3 is a flow diagram depicting selected elements of an embodiment of a method for authenticating a person as an authorized user in an information handling system.

Particular embodiments are best understood by reference to FIGS. 1-3, where like numbers are used to indicate like and corresponding parts.

FIG. 1 depicts an architectural diagram of an exemplary portable information handling system capable of the functionality of a desktop information handling system but also capable of operating on battery power. Information handling system 100 comprises CPU 110, display 111, Wi-Fi port 112, Ethernet connection 114, HD audio port 116, memory 120, storage 124, touchpad 132, camera 134, USB connection 136, card reader 138 and mouse 139.

CPU 110 comprises a system, device, or apparatus configured to interpret and/or execute program instructions and/or process data. In some embodiments, CPU 110 comprises a microprocessor, microcontroller, digital signal processor (DSP), application specific integrated circuit (ASIC) or another digital or analog circuitry configured to interpret and/or execute program instructions and/or process data. CPU 110 is coupled to display 111 comprising a monitor, screen, or other apparatus for displaying information processed by information handling system 100. CPU 110 is connected to audio port 116 to allow a user to connect headphones or other external audio devices for listening to audio content presented by information handling system 100. CPU 110 is connected to system memory 120 comprising a system, device, or apparatus operable to retain and/or retrieve program instructions and/or data. In some embodiments, system memory 120 comprises random access memory (RAM), electrically erasable programmable read-only memory (EEPROM), a PCMCIA card, flash memory, magnetic storage, opto-magnetic storage, and/or array of volatile or non-volatile memory that retains data after information handling system 100 is powered down or in an inactive state. CPU 110 is connected to local storage 124 comprising computer-readable media (e.g., hard disk drive, floppy disk drive, CD-ROM, and/or other type of rotating storage media, flash memory, EEPROM, and/or another type of solid-state storage media) and operable to store instructions and/or data. Computer-readable media may include an instrumentality or aggregation of instrumentalities that may retain data and/or instructions for some time period. Storage 124 such as computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing. Communicative coupling between CPU 110 and other components may refer to any of a variety of bus structures, e.g., a memory bus, a peripheral bus, or a local bus enabling communication between components in information handling system 100. Examples of bus architectures include Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. CPU 110 is connected to Wi-fi port 112 and Ethernet connection 114, which allow information handling system 100 to connect to various networks (not shown) for communicating with other information handling systems.

Power button 160 is configured for powering up or turning off information handling system 100 and is coupled to embedded controller 150. If information handling system 100 is powered down or in an inactive state, pushing power button 160 sends an instruction to embedded controller 150 to power up information handling system 100.

Information handling system 100 is adapted with devices for user interaction. For example, information handling system 100 includes keyboard/touchpad 141, touch sensor 132 for a display and mouse for manual user input, camera 134 to capture images and video content, USB port 136 for connecting to various other devices and Common Access Card (CAC) reader 138 for receiving a card storing information.

Keyboard/Touchpad 141 allows a user to enter information and commands into information handling system 100 and is coupled to a keyboard/touchpad controller 142 adapted to process some basic commands and instructions related to keyboard input, which reduces some of the processing demands on CPU 110. Keyboard/Touchpad 141, touch sensor 132, mouse 139, camera 134 and CAC reader 138 also allow user interaction with CPU 110. Each of power button 160, mouse 139, keyboard/touchpad 141, touch sensor 132, camera 134, USB connector 136 and CAC reader 138 has a sensor, microcontroller unit (MCU) 163 and internal memory 164.

MCU 163 is coupled to sensor 162 and internal memory 164. Sensor 162 is configured to sense an attempt by a person to access information handling system 100 and further configured to capture biometric information about the person. For example, sensor 162-1 associated with power button 160 and sensors 162-2 and 162-3 comprise fingerprint recognition (FPR) sensors adapted to sense when a person contacts power button 160 or mouse 139-2 or 139-3, respectively. Touch sensor 132 has sensors 162-4 to determine hand geometry of a user touching a display panel, a remote touchpad (not shown) may have FPR sensors, camera 134 has proximity sensor 162-5, USB connector 136 comprises connection sensor 162-6 and CAC reader 138 comprises optic scanner 162-7. When any of sensors 162 sense an attempt to access information handling system 100, a signal is sent to MCU 163. MCU 163 can send an instruction to the sensor or device to wake up and capture biometric information about a person associated with an attempt to access information handling system 100. For example, sensor 162-1 on power button 160 may send a signal that indicates a person is attempting to access information handling system 100. MCU 163-1 sends an instruction to sensor 162-1 to capture fingerprint information and MCU 163-1 compares the captured information with information stored in memory 164-1 to determine if the person is authorized to access information handling system. If so, MCU 163-1 sends an instruction or command to EC 150 or CPU 110 to wake information handling system 100.

In another example, proximity sensor 162-5 associated with camera 134 may detect a person near camera 134 and send a signal to MCU 163-5. MCU 163-5 may wake up camera 134 to capture biometric information about a person near camera 134 and compare the captured information with information stored in internal memory 164-5 to determine if the person is authorized to access information handling system 100. If so, MCU 163-1 sends an instruction or command to EC 150 or CPU 110 to wake information handling system 100.

In another example, connection sensor 162-6 associated with USB connector 136 may detect a person inserting a USB device in USB connector 136 and send a signal to MCU 163-6. MCU 163-6 may send an instruction to a sensor associated with the USB device connected to USB connector 136 to capture biometric information about a person and compare the captured information with information stored in internal memory 164-6 to determine if the person is authorized to access information handling system 100. If so, MCU 163-6 sends an instruction or command to EC 150 or CPU 110 to wake information handling system 100.

In another example, optic sensor 162-7 associated with CAC reader 138 may detect a person inserting a CAC in CAC reader 138 and send a signal to MCU 163-7. MCU 163-7 may scan a CAC in CAC reader and capture biometric information about a person associated with a CAC in CAC reader 138 and compare the captured information with information stored in internal memory 164-7 to determine if the person is authorized to access information handling system 100. If so, MCU 163-7 sends an instruction or command to EC 150 or CPU 110 to wake information handling system 100.

In each of these examples, a sensor 162, MCU 163 and internal memory 164 are used to authenticate a person before any communication is sent to CPU 110 or EC 150 that would cause information handling system 100 to wake from an inactive state to an active state. Once a person is authenticated, MCU 163 sends an instruction to CPU 110 to wake information handling system 100 to an active state to receive user commands, including turning on display 111.

Embodiments disclosed herein may be implemented in various devices integrated with information handling system 100 or separate but communicatively coupled with information handling system 100. For example, power button 160 may be integrated in a keyboard in a laptop or in a keyboard coupled to the laptop via a wired connection through USB connector 136 or wirelessly connected to the laptop. As another example, FIG. 1 depicts mouse 139-1 having a wired connection to CPU 110 and FIG. 2 depicts alternative embodiments in which mouse 139-2 is wirelessly coupled to CPU 110 via USB dongle 137 and, alternatively, mouse 139-3 is wirelessly coupled to CPU 110 via Bluetooth and Wi-fi port 112.

CPU 110 is coupled via Serial Peripheral Interface (SPI) 152 to embedded controller (EC) 150, which communicates with keyboard/touchpad controller 142 and processes basic instructions from keyboard 141 through keyboard/touchpad controller 142. Embedded controller 150 is also coupled to battery 153, AC adapter 155 and regulator 154 for receiving power when connected to a constant power source and to allow users to interact with information handling system 100 when AC adapter 155 is disconnected from a constant power source. Embedded controller 150 is also adapted to control fan 144 for cooling components in information handling system 100. Embedded controller 150 monitors battery charge, voltage or other parameters related to AC adapter 155 or regulator 154, fan speed, and other functions necessary to configure information handling system 100 for operation.

The interaction of CPU 110 with respect to processing user commands results in CPU 110 using a significant portion of the power consumed by information handling system 100. In particular, in addition to the power supplied to CPU 110, the power used by fan 144 to cool CPU 110 and the power needed to communicate with other information handling systems result in significant power needed to operate information handling system 100 in an active state. In an information handling system coupled to a constant power source, power is generally a minor concern. In contrast, for an information handling system operating on battery power, the rate at which CPU 110 and other components use battery charge can greatly reduce battery life. One way in which power is conserved is by changing operation of information handling system 100 from an active state to an inactive state.

For purposes of this disclosure, a portable information handling system may be considered to be operating in an active state if CPU 110 is performing operations by executing a set of instructions related to storing and receiving information from memory 120, presenting information to a user via display 111, or communicating with other information handling systems over a network such as using Wi-Fi 112 or Ethernet 114, communicating via an input/output (I/O) system such as keyboard 141, touchpad 132, camera 134, USB connector 136 or card reader 138. An information handling system may be locked or unlocked, but if the CPU or other components are still performing some processing, the information handling system and would be considered to be operating in an active state. A portable information handling system may be considered to be in an inactive state if CPU 110 is not executing user commands, a display screen 111 is turned off or in a screen saver mode, Wi-fi port 112 and Ethernet port 114 are closed, disconnected or otherwise communicating with any networks, camera 134, touch sensor 132, mouse 139 and keyboard/touchpad controller 142 are not detecting inputs, or CPU 110 is otherwise performing minimal processing and memory access. An information handling system may be locked or unlocked but still performing some processing and would be considered to be operating in an active state.

Generally, information handling systems are configured such that when a user attempts to access the information handling system, the information handling system wakes up such that CPU 110 powers up and executes instructions to authenticate the person. Even though the person might not be authenticated and not all functionality of the information handling system is available, the information handling system is still in an active state while the CPU executes the instructions to authenticate the person. To determine when to switch from an active state to an inactive state, embedded controller 150 communicates with CPU 110, fan 144, battery 153, AC adapter 155 and regulator 154 and is configured to adjust settings or operation of information handling system 100 based on the processing status of CPU 110 and the battery charge decreasing below a threshold charge or upon notification that AC adapter 155 is disconnected or a power supply is interrupted. If embedded controller 150 determines from CPU 110 that no user input has been received for some time or determines that the battery charge is below a threshold value and is not being charged, embedded controller 150 is configured to turn off, power down or otherwise change operation of information handling system 100 from an active state to an inactive state. Determining when to switch from an inactive state to an active state generally depends on user input. For example, pushing power button 160, moving mouse 139, touching touchpad 132, picking up a stylus, moving near camera 134, voice commands (e.g., Wake on Voice) and inserting a CAC into CAC reader 138 are examples of user inputs that typically result in information handling system 100 changing operation from an inactive state to an active state.

Often, an information handling system operating in an inactive state is locked and can only be unlocked by an authorized user. These information handling systems have authentication systems for determining if a user is authorized to unlock the information handling system. In biometric authentication systems, a person allows the information handling system to capture biometric information such as fingerprint, iris, face and hand geometry recognition information via a fingerprint recognition (FPR) sensor, an iris recognition sensor, a facial recognition application or a hand geometry recognition application. Memory in the information handling system stores the biometric information for authenticating the person as an authorized user of the information handling system and a CPU compares captured biometric information with information stored in memory to determine if the person is an authenticated user. An alternative to fingerprint, iris or face recognition involves two-factor authentication systems in which a person uses a physical device and a second input for dual factor authorization. Examples of dual factor authorization include a person inserting a common access card (CAC) in a CAC card reader along with entering their password, and a person positioning a keyless device with built-in authentication protocols (commonly referred to as a key fob or fob) near the authentication system and entering either a password or a passcode generated by the key fob. These authentication systems include hardware, firmware and instructions for interaction with a person and communication with the CPU in the information handling system and may be physically connected to or integrated with the information handling system or may be wirelessly connected to the information handling system using an interface. Memory in the information handling system stores information for authenticating the person as an authorized user of the information handling system and the CPU compares captured information with information stored in memory to determine if the person is an authenticated user. If the information handling system authenticates the person as an authorized user, the user is allowed to access the system. Ideally, if a person is not authenticated, the information handling system does not allow the person to access the system.

A drawback to information handling systems having these authentication systems is the need to power up each time a person tries to unlock the information handling system. In information handling systems coupled to a continuous power source, powering up a CPU and executing instructions to authenticate a person may be a minor concern. However, in portable information handling systems, repeated cycles of powering up a CPU, display and other components in an information handling system to authenticate persons as authorized users can drain the battery due to power needed to present an image on display 111, retrieve and open applications stored in memory 120 or storage 124, open Wi-fi and Ethernet connections, and perform any other active processing requirements. Powering up portable information handling systems each time a person wants access is also undesirable for making the information handling system more vulnerable to attacks. For example, if a portable information handling system is configured to locate and connect to any available network upon startup and a person tries to access the information handling system, an authentication system might power up the CPU to authenticate the person, but the CPU might also execute a set of instructions to automatically initiate connections with a network.

After some time, if a person is not authenticated or if a portable information handling system determines no user input has been received in a specified period, the portable information handling system is powered down to an inactive state to save battery power. When the portable information handling system is turned off or powered down to an inactive state such as a screen saver mode, a sleep mode or a hibernate mode, the reduced power consumption allows components to cool down, prevents screen damage, and otherwise protects information handling system 100 and saves battery power. Furthermore, the portable information handling system in an inactive state can disconnect from a network to protect the portable information handling system from hacking and cyber attacks. However, each time a person wants to access the portable information handling system, the CPU powers up to the active state.

To conserve power and protect an information handling system from unauthorized access, embodiments disclosed herein allow certain components in an information handling system to remain in an inactive state while an authentication system operating on a microcontroller unit (MCU) authenticates a person attempting to access the information handling system. In particular, embodiments disclosed herein include systems and methods implemented in MCUs for authenticating a person as an authorized user before sending an instruction or command to an embedded controller (EC) to change operation from an inactive state to an active state. Attempts to access information handling system 100 when information handling system 100 is operating in an inactive state are processed by an MCU, allowing CPU 110, EC 150, display 111 and other components to remain in an inactive state to reduce power consumption and protect information handling system 100.

In embodiments disclosed herein, an authentication system comprises a sensor for sensing an attempt by a person to access information handling system 100 and capturing biometric information about a person trying to access information handling system 100, microcontroller (MCU) 163 for determining a person is trying to access information handling system 100, and authentication system internal memory storing information or templates associated with authorized users. MCU 163 compares biometric information received from the device, compares the received biometric information with the information or templates stored in authentication system internal memory and determines if the received biometric information matches the stored biometric information. If there is a match, MCU 163 sends an instruction that triggers CPU 110 to wake up. The information or templates stored in authentication system internal memory 164 comprise information that allows MCU 163 to determine if the person is an authorized user, but the information or templates are protected to ensure the information cannot be used in the event a peripheral device containing the authentication system is separated from information handling system 100. In some embodiments, the information is encrypted. In some embodiments, a template corresponding to the information is stored in authentication system internal memory 164.

To aid in understanding, certain embodiments are described in greater detail. In some embodiments, power button 160 depicted in FIG. 1 comprises an integrated fingerprint reader (FPR) sensor 162-1 for receiving fingerprint information from a user contacting power button 160, a microcontroller unit (MCU) 163-1 and internal memory 164-1. Resting a finger on FPR sensor 162-1 allows FPR sensor 162-1 to capture fingerprint information and FPR sensor 162-1 is configured to communicate the fingerprint information to MCU 163-1. MCU 163-1 compares the captured fingerprint information with information or templates stored in internal memory 164-1 to determine if the fingerprint matches fingerprint information with a registered user. If MCU 163-1 determines the captured fingerprint information matches information stored in internal memory 164-1, MCU 163-1 is configured to communicate an instruction such that information handling system 100 changes operation to an active state. In some embodiments, MCU 163-1 sends an instruction directly to CPU 110 to wake up information handling system 100. In other embodiments, MCU 163-1 sends an instruction to embedded controller 150, embedded controller 150 determines operating parameters of information handling system 100 and sends an instruction to CPU 110 to wake up information handling system 100.

As another example, in some embodiments, each mouse 139 depicted in FIG. 1 or 2 each comprise an integrated fingerprint reader (FPR) sensor 162 for receiving fingerprint information from a user contacting a button on mouse 139, a microcontroller unit (MCU) 163 and internal memory 164. Resting a finger on FPR sensor 162 allows fingerprint recognition software to capture fingerprint information. FPR sensor 162 is adapted to capture fingerprint information and is configured to communicate the fingerprint information to MCU 163. MCU 163 compares the captured fingerprint information with information or templates stored in internal memory 164 to determine if the fingerprint matches fingerprint information with a registered user. If MCU 163 determines the captured fingerprint information matches information stored in internal memory 164, MCU 163 is configured to communicate an instruction such that information handling system 100 changes operation to an active state. In some embodiments, MCU 163 sends an instruction directly to CPU 110 to wake up information handling system 100. In other embodiments, MCU 163 sends an instruction to embedded controller (EC) 150, EC 150 determines operating parameters of information handling system 100 and sends an instruction to CPU 110 to wake up information handling system 100. Once information handling system 100 is operating in an active state, mouse 139 is communicatively coupled to CPU 110 to allow a user to interact with CPU 110.

As another example of an authentication system, a stylus (not shown) comprises an integrated fingerprint reader (FPR) sensor 162 for receiving fingerprint information from a person holding the stylus, a microcontroller unit (MCU) 163 and internal memory 164. Resting a finger on FPR sensor 162 allows fingerprint recognition software to capture fingerprint information. FPR sensor 162 is adapted to capture fingerprint information and is configured to communicate the fingerprint information to MCU 163. MCU 163 compares the captured fingerprint information with fingerprint information or templates stored in internal memory 164 to determine if the fingerprint matches fingerprint information with a registered user. If MCU 163 determines the captured fingerprint information matches information stored in internal memory 164, MCU 163 is configured to communicate an instruction such that information handling system 100 changes operation to an active state. In some embodiments, MCU 163 sends an instruction directly to CPU 110 to wake up information handling system 100. In other embodiments, MCU 163 sends an instruction to embedded controller 150, embedded controller 150 determines operating parameters of information handling system 100 and sends an instruction to CPU 110 to wake up information handling system 100. Once information handling system 100 is operating in an active state, the stylus is communicatively coupled to CPU to allow a user to interact with CPU 110.

As another example of an authentication system, camera 134 comprises a proximity detection sensor for detecting a person near camera 134, a microcontroller unit (MCU) and internal memory 164. The proximity detection sensor detecting a face near camera 134 triggers camera 134 to capture an image with iris or face information and communicate the iris or face information to MCU 163 integrated in camera 134. MCU 163 compares the captured iris or face information with information or templates stored in internal memory 164 to determine if the iris or face matches iris or face information with a registered user. If MCU 163 determines the captured iris or face information matches iris or face information stored in internal memory 164, MCU 163 is configured to communicate an instruction such that information handling system 100 changes operation to an active state. In some embodiments, MCU 163 sends an instruction directly to CPU 110 to wake up information handling system 100. In other embodiments, MCU 163 sends an instruction to embedded controller 150, embedded controller 150 determines operating parameters of information handling system 100 and sends an instruction to CPU 110 to wake up information handling system 100. Once information handling system 100 is operating in an active state, camera 134 is communicatively coupled to CPU to allow a user to interact with CPU 110.

FIG. 3 depicts a flow diagram illustrating an embodiment of a method 300 for authenticating a person as an authorized user before changing operation of an information handling system 100 from an inactive state to an active state.

Authenticating a person is initiated at step 310. Step 310 may be initiated by a person pushing power button 160, touching mouse 139, keyboard 141 or a display panel coupled to touch sensor 132, picking up a stylus, positioning their face, eyes or hands near a camera, inserting a CAC into a CAC reader 138, or otherwise interacting with a power button or device, including a peripheral device having an associated sensor 162, a microcontroller unit (MCU) 163 and internal memory 164, coupled to information handling system 100. In step 310, a person contacting the power button, moving a mouse, picking up a stylus, touching a touch pad, positioning their face, eyes or hands near a camera, inserting a CAC into a CAC reader 138, or otherwise attempting to access information handling system 100 is detected by a sensor 162 coupled to device MCU 163. The sensor is configured to capture biometric information about the person and communicate the biometric information to MCU 163.

In some embodiments, MCU 163 includes instructions to filter biometric information in step 312 to prevent an accidental powering up of information handling system 100. Filtering may include identifying multiple clicks of a mouse, determining a person dragged fingers across a touchpad, a person picked up a stylus, or some other contact. Filtering may also include measuring time duration to determine if a person requesting access has exceeded a minimum time duration, determining a number of clicks exceeds a minimum number of clicks, determining the person dragged at least two fingers or dragged the fingers in a particular direction, or the like to prevent accidental touches from starting an authentication process. In some embodiments, filtering includes determining if the person double clicked power button 160.

In step 325, MCU 163 communicates with internal memory 164 to determine if the biometric information registered sufficiently to enable an authentication process. In embodiments of information handling system 100 with fingerprint recognition, MCU 163 compares the captured biometric information with information or templates stored in internal memory 164 to determine if the fingerprint recognition sensor collected enough fingerprint information to authenticate a person. If not, MCU 163 does not communicate any instructions to CPU 110, but the person can try again to input the information. In some embodiments in step 317, an indicator that the attempt failed is conveyed to the person. For example, an amber LED on power button 160 may indicate an unsuccessful attempt.

If the fingerprint recognition sensor collected enough biometric information, then in step 330, MCU 163 determines if the captured biometric information matches information stored in internal memory 164. For an information handling system with an FPR reader, MCU 163 compares captured biometric information with information or templates stored in internal memory 164 to determine if the finger print was a previously registered fingerprint. Similarly, for face or iris recognition, embodiments determine if an image matches an image of the iris or face. If the captured biometric information communicated from a sensor matches information stored in internal memory 164, then in step 370, MCU 163 executes an instruction to power up or change operation of information handling system 100 from an inactive state to an active state. In some embodiments, internal memory 164 contains instructions executable by MCU 163 such that, if MCU 163 determines a person is authorized user, MCU 163 executes a command to instruct CPU 110 to power up and automatically log the user into a user account.

Alternatively, in step 340 MCU 163 includes instructions to determine if this is a first login for information handling system 100. If information handling system 100 has never powered on before or of no person has tried to log on to the system, then in step 340, MCU 163 executes an instruction to power up information handling system 100 to receive biometric information from the person. Biometric information may then be stored in internal memory 164 to allow the user to access information handling system 100 based on the stored biometric information.

In step 372, information handling system 100 operating in an active state waits for user input. If a command is received, information handling system 100 operates in an active state and executes the command in step 374. If no command is received for some time, information handling system 100 powers down to an inactive state in step 375.

In step 380, an information technology (IT) administrator remotely logging in to information handling system 100 connects to CPU 110 directly to allow the IT administrator to bypass the system.

Several examples included herein describe techniques for authenticating a person as an authorized user. Those skilled in the art will appreciate that other devices and techniques for interacting with the devices described herein are possible without departing in scope.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for authentication, the system comprising:
  a mouse separate from and wirelessly coupled to an information handling system in an inactive state, the mouse comprising:
    a fingerprint reader sensor for sensing biometric information;
    an internal memory storing biometric information corresponding to an authenticated user;
    a microcontroller (MCU) coupled to the fingerprint reader sensor and configured for:
      receiving an indication of one or more of the mouse is moving a time duration and a plurality of clicks on the mouse;
      communicating a signal to the fingerprint reader sensor to capture biometric information;
      capturing, by the fingerprint reader sensor, the biometric information;
      comparing the captured biometric information with the biometric information stored in the internal memory to determine if the captured biometric information matches the stored biometric information, wherein
        if the captured biometric information matches the stored biometric information, communicating an instruction to one of a central processing unit (CPU) or an embedded controller (EC) in the information handling system to change operation of the information handling system from the inactive state to an active state;
        if the captured biometric information does not match the stored biometric information, the MCU does not communicate the instruction to the CPU or EC in the information handling system to change the operation of the information handling system from the inactive state to the active state; and
      in response to receiving the instruction from the MCU, one of the CPU or the EC changes the operation of the information handling system from the inactive state to the active state.

2. The system of claim 1, wherein:
the mouse includes a button; and
the button comprises the fingerprint reader sensor.

3. The system of claim 1, wherein:
the inactive state comprises one of a sleep mode and an off mode.

4. A method for authentication, the method comprising:
storing, in a mouse separate from and wirelessly coupled to an information handling system in an inactive state, biometric information corresponding to an authorized user;
detecting, by the mouse, an indication of one or more of the mouse is moving a time duration and a plurality of clicks on the mouse;
communicating a signal to a fingerprint reader sensor in the mouse to capture biometric information;
capturing, by the fingerprint reader sensor, the biometric information;
comparing, by a microcontroller unit (MCU) coupled to the fingerprint reader sensor, the captured biometric information with the stored biometric information to determine if the captured biometric information matches the stored biometric information; and
sending, by the MCU, an instruction to one of a central processing unit (CPU) or an embedded controller (EC) in the information handling system to change operation of the information handling system from the inactive state to an active state if the captured biometric information matches the stored biometric information,
wherein if the captured biometric information does not match the stored biometric information, the MCU does not send the instruction to the CPU or EC in the information handling system to change the operation of the information handling system from the inactive state to the active state; and
in response to receiving the instruction from the MCU, one of the CPU or the EC changes the operation of the information handling system from the inactive state to the active state.

5. The method of claim 4, wherein:
the inactive state comprises one of a sleep mode and an off mode.

6. A system for authentication, the system comprising:
a mouse separate from and wirelessly coupled to one of a CPU and an EC in an information handling system, the mouse comprising:
  a fingerprint reader sensor for sensing biometric information;
  an internal memory storing biometric information corresponding to an authenticated user;
  a microcontroller (MCU) coupled to the fingerprint reader sensor and configured for:
    receiving an indication of one or more of the mouse is moving a time duration and a plurality of clicks on the mouse;

communicating a signal to the fingerprint reader sensor to capture biometric information;

receiving captured biometric information from the fingerprint reader sensor;

comparing the captured biometric information with the biometric information stored in the internal memory; and if the captured information matches the stored biometric information, communicating an instruction to one of the CPU or the EC in the information handling system to change operation of the information handling system from an inactive state to an active state;

if the captured information does not match the stored biometric information, the MCU does not communicate the instruction to the CPU or the EC in the information handling system to change the operation of the information handling system from the inactive state to the active state; and in response to receiving the instruction from the MCU, one of the CPU or the EC changes the operation of the information handling system from the inactive state to the active state.

7. The system of claim 6, wherein:

the inactive state comprises one of a sleep mode and an off mode.

\* \* \* \* \*